Feb. 9, 1932.  P. BEGHETTI  1,844,343
WIRE TWISTER
Filed Nov. 11, 1929
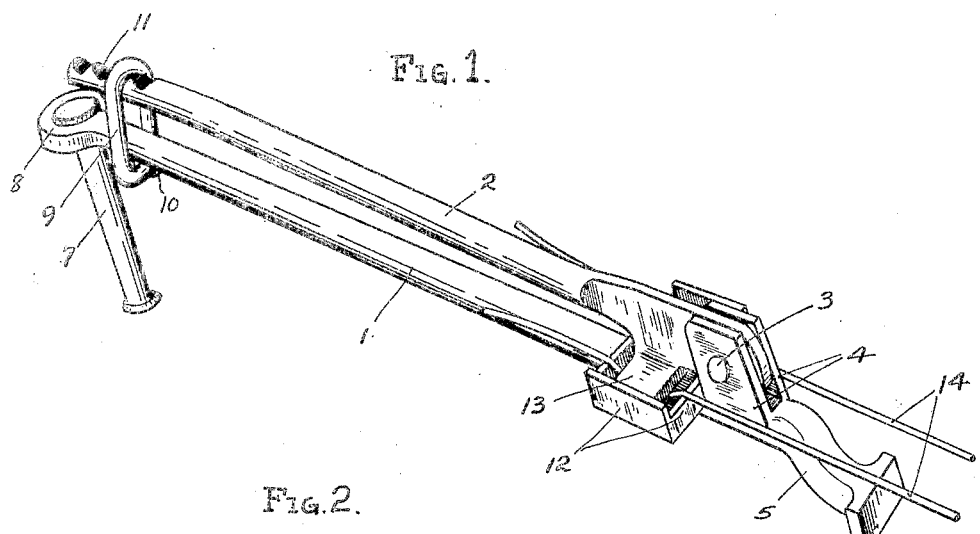
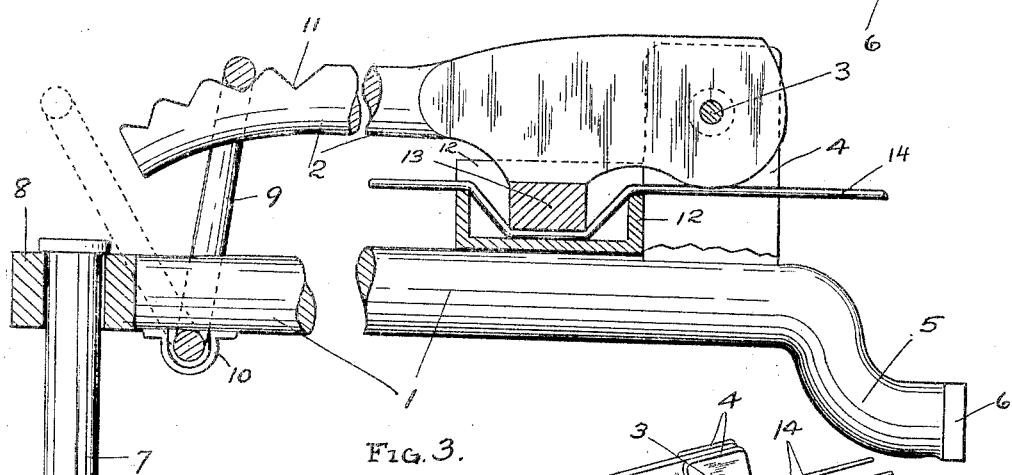
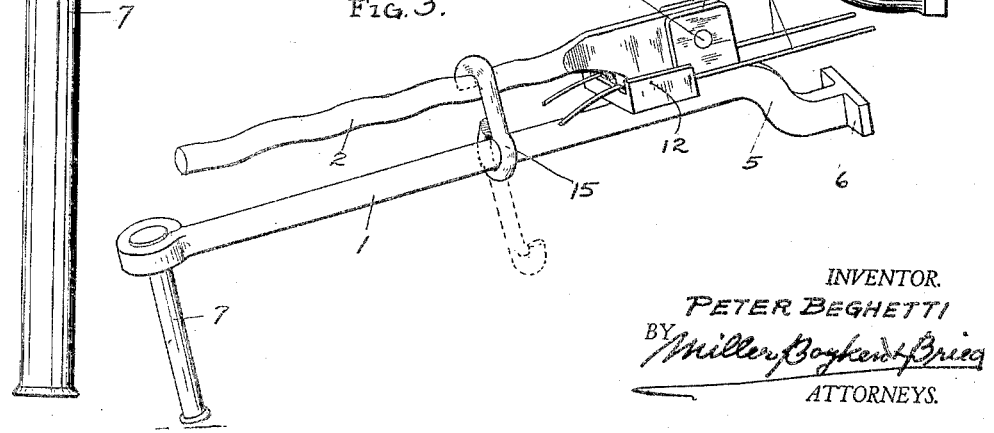
INVENTOR.
PETER BEGHETTI
BY Miller Boykin & Brieg
ATTORNEYS.

Patented Feb. 9, 1932

1,844,343

UNITED STATES PATENT OFFICE

PETER BEGHETTI, OF SAN FRANCISCO, CALIFORNIA

WIRE TWISTER

Application filed November 11, 1929. Serial No. 406,380.

This invention relates to wire twisters as used in the erecting of concrete forms in building of concrete structures generally, and has for its objects a simple and effective device for the purpose mentioned, particularly adapted to work in corners and places where prior tools of this kind patented by me could not be efficiently used.

In the drawings Fig. 1 is a perspective view of one form of my twister, Fig. 2 is an enlarged broken side view thereof with portions of the jaws, link and handle broken away, and Fig. 3 is a perspective view of a modified form of my improved twister.

In further detail the twister comprises a pair of handles 1—2, the latter pivoted at 3 between a pair of lugs 4 projecting upward from handle 1, and handle 1 provided with an outwardly and forwardly projecting horn 5 having at its outer end a transversely extending heel or foot 6 with a substantially flat outer surface.

At the opposite end of handle 1 is a vice handle 7 slidable through a ring 8, and a link 9 pivoted in a loop 10 welded to the underside of handle 1 in a manner to swing over the top of handle 2 to engage in any of several notches 11 formed on the end of handle 2 which is curved downwardly toward handle 1 as best shown in Fig. 2.

Just back of lugs 4 is a pair of interlocking jaws 12 and 13 carried respectively by handles 1 and 2, jaw 12 taking the form of a channel open on top and with front, back and end walls, the channel extending transversely of the handles, while jaw 13 is of simple rectangular shape fitting freely within the channel so as to clamp a pair of wires 14 therein, one to either side of lugs 4, and put a quadruple kink in each wire when the handles are brought together, and in which position the handles are locked by swinging the link 9 into engagement over handle 2, all as clearly shown in Figs. 1 and 2.

The construction shown in Fig. 3 is the same in all respects where similarly numbered, except that the link 9 is dispensed with, and either one or both handles is notched or undulated as shown for handle 2 in Fig. 3 and a hook link 15 is loosely and slidably mounted on handle 1 so as to hook over handle 2 at any point therealong to clamp the handles together, the undulations in the handle preventing the hook link from becoming displaced.

In use, the hand levers are opened, the two wires to be twisted are laid across the jaws and clamped, then with the heel 6 resting against the form structure the wires are pulled taut, and twisted by revolving the tool with the vise handle.

It will be noted that the handles lie comparatively close together, and as the vise handle can be slid back and forth, and the operator does not have to hold on to the handles to prevent the wires slipping, it is possible to work quickly in places where other twisting tools of this character could not be used to advantage.

I claim:

1. A wire twister comprising a pair of hand levers pivoted at the forward end to open rearwardly at an angle and to close substantially parallel, an outwardly and forwardly projecting foot on one of the levers, a pair of transversely extending jaws on said handles back of the pivotal point formed to fit one within the other and means on one of said jaws to prevent a wire clamped therein from coming out at the end of the jaws.

2. A wire twister comprising a pair of hand levers pivoted at the forward end to open rearwardly at an angle and to close substantially parallel, an outwardly and forwardly projecting foot on one of the levers, and a pair of transversely extending jaws on said handles back of the pivotal point formed to fit one within the other in a manner to kink a wire in several places when clamped between the jaws the pivot of the hand levers being positioned above the jaws.

3. A wire twister comprising a pair of hand levers pivoted at the forward end to open rearwardly at an angle and to close substantially parallel, an outwardly and forwardly projecting foot on one of the levers, and a pair of transversely extending jaws on said handles back of the pivotal point formed to fit one within the other, one of said jaws being channel shaped, and the other jaw extending longitudinally within said channel when the jaws are closed.

4. A wire twister comprising a pair of hand levers pivoted at the forward end to open rearwardly at an angle and to close substantially parallel, an outwardly and forwardly projecting foot on one of the levers, and a pair of transversely extending jaws on said handles back of the pivotal point formed to fit one within the other, one of said jaws being channel shaped and closed on its end, and the other jaw extending longitudinally within said channel when the jaws are closed.

5. A wire twister comprising a pair of hand levers pivoted together adjacent their forward ends, an outwardly and forwardly extending foot on one of said levers, and a pair of jaws, one on each lever adjacent the pivotal point extending transversely of the levers arranged in offset relation to one another and provided with a plurality of edges whereby to put four kinks in a wire gripped therebetween.

6. A wire twister comprising a pair of hand levers pivoted together adjacent their forward ends, an outwardly and forwardly extending foot on one of said levers, and a pair of jaws, one on each lever adjacent the pivotal point extending transversely of the levers arranged in offset relation to one another whereby to put a kink in a wire gripped therebetween, and a vise handle slidably mounted in a ring formed on the end of one of the levers.

7. A wire twister comprising a pair of hand levers pivoted together adjacent their forward ends, an outwardly and forwardly extending foot on one of said levers, and a pair of jaws, one on each lever adjacent the pivotal point extending transversely of the levers arranged in offset relation to one another whereby to put a kink in a wire gripped therebetween, a vise handle slidably mounted in a ring formed on the end of one of the levers, and means for locking the handles together.

PETER BEGHETTI.